United States Patent
Kato

(10) Patent No.: US 10,153,090 B2
(45) Date of Patent: Dec. 11, 2018

(54) MULTILAYER CERAMIC CAPACITOR HAVING EXTERNAL ELECTRODES PROVIDED ON BOTTOM FACE AND CONDUCTOR AND COVER LAYERS PROVIDED ON FRONT AND REAR FACES

(71) Applicant: TAIYO YUDEN CO., LTD., Taito-ku, Tokyo (JP)

(72) Inventor: Yoichi Kato, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/461,230

(22) Filed: Mar. 16, 2017

(65) Prior Publication Data

US 2017/0278634 A1    Sep. 28, 2017

(30) Foreign Application Priority Data

Mar. 25, 2016    (JP) .................................. 2016-061493

(51) Int. Cl.
   *H01G 4/30*    (2006.01)
   *H01G 4/12*    (2006.01)
   (Continued)

(52) U.S. Cl.
   CPC ............ *H01G 4/30* (2013.01); *H01G 4/0085* (2013.01); *H01G 4/012* (2013.01); *H01G 4/12* (2013.01); *H01G 4/232* (2013.01)

(58) Field of Classification Search
   CPC ...... H01G 4/232; H01G 4/0085; H01G 4/012; H01G 4/12
   See application file for complete search history.

(56) References Cited

U.S. PATENT DOCUMENTS

| 6,496,335 B2 * | 12/2002 | Gill ........................... G11B 5/11 360/319 |
| 2008/0239617 A1 * | 10/2008 | Motoki .................. H01G 4/232 361/301.4 |

(Continued)

FOREIGN PATENT DOCUMENTS

| JP | H0684687 A | 3/1994 |
| JP | 2005012167 A | 1/2005 |

(Continued)

OTHER PUBLICATIONS

A Notification of Reasons for Refusal issued by the Japanese Patent Office, dated Mar. 1, 2018, for Japanese counterpart application No. 2016-061493.

*Primary Examiner* — David M Sinclair
(74) *Attorney, Agent, or Firm* — Law Office of Katsuhiro Arai

(57) ABSTRACT

In an embodiment, one length-direction end of each first internal electrode layer 111a is connected to the first conductor layer 112 of the capacitor body 110 over a connection width equivalent to the width of each first internal electrode layer 111a, while the other length-direction end of each second internal electrode layer 111b is connected to the second conductor layer 113 over a connection width equivalent to the width of each second internal electrode layer 111b. One height-direction end of the first conductor layer 112 is connected to the first external electrode 120 over a connection width equivalent to the width of the first conductor layer 112, while one height-direction end of the second conductor layer 113 is connected to the second external electrode 130 over a connection width equivalent to the width of the second conductor layer 113.

12 Claims, 8 Drawing Sheets

(51) Int. Cl.
  *H01G 4/232* (2006.01)
  *H01G 4/008* (2006.01)
  *H01G 4/012* (2006.01)

(56) References Cited

U.S. PATENT DOCUMENTS

| | | | | |
|---|---|---|---|---|
| 2009/0310277 A1* | 12/2009 | Kayatani | ............... | H01G 4/005 |
| | | | | 361/306.3 |
| 2010/0290173 A1* | 11/2010 | Yoon | ............... | H01G 2/06 |
| | | | | 361/321.2 |
| 2013/0020913 A1* | 1/2013 | Shirakawa | ............... | H01G 4/30 |
| | | | | 310/364 |
| 2014/0041930 A1* | 2/2014 | Yanagida | ............... | H05K 7/00 |
| | | | | 174/549 |
| 2014/0104750 A1* | 4/2014 | Ahn | ............... | H01G 4/30 |
| | | | | 361/306.3 |
| 2014/0116766 A1* | 5/2014 | Jeon | ............... | H05K 3/3442 |
| | | | | 174/260 |
| 2014/0124251 A1* | 5/2014 | Park | ............... | H05K 3/3442 |
| | | | | 174/257 |
| 2014/0198427 A1* | 7/2014 | Kamobe | ............... | H01G 4/30 |
| | | | | 361/301.4 |
| 2014/0290999 A1* | 10/2014 | Park | ............... | H01G 4/30 |
| | | | | 174/260 |
| 2015/0022945 A1* | 1/2015 | Park | ............... | H01G 4/30 |
| | | | | 361/301.4 |
| 2015/0043125 A1* | 2/2015 | Park | ............... | H01G 4/12 |
| | | | | 361/301.4 |
| 2015/0124370 A1* | 5/2015 | Ahn | ............... | H01G 4/224 |
| | | | | 361/272 |

FOREIGN PATENT DOCUMENTS

| | | |
|---|---|---|
| JP | 2008283170 A | 11/2008 |
| JP | 2014036149 A | 2/2014 |
| JP | 2014116571 A | 6/2014 |
| JP | 2015053503 A | 3/2015 |
| JP | 2015090977 A | 5/2015 |
| JP | 2015204451 A | 11/2015 |

\* cited by examiner

[FIG. 8]
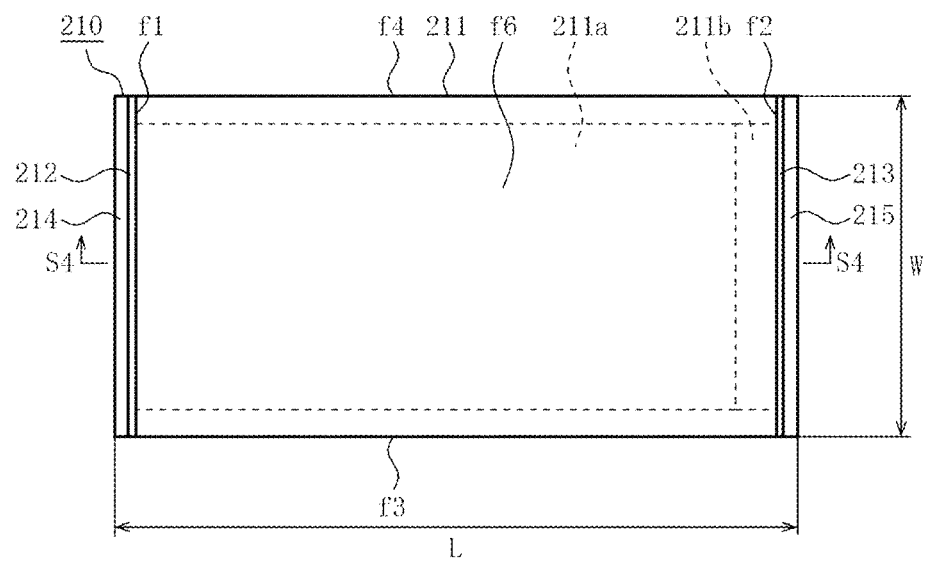
[FIG. 9]
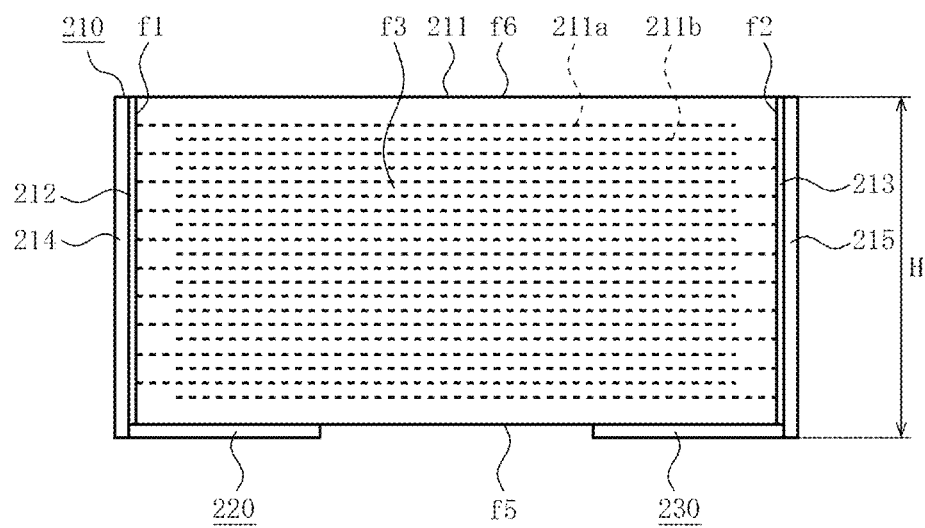

[FIG. 10]
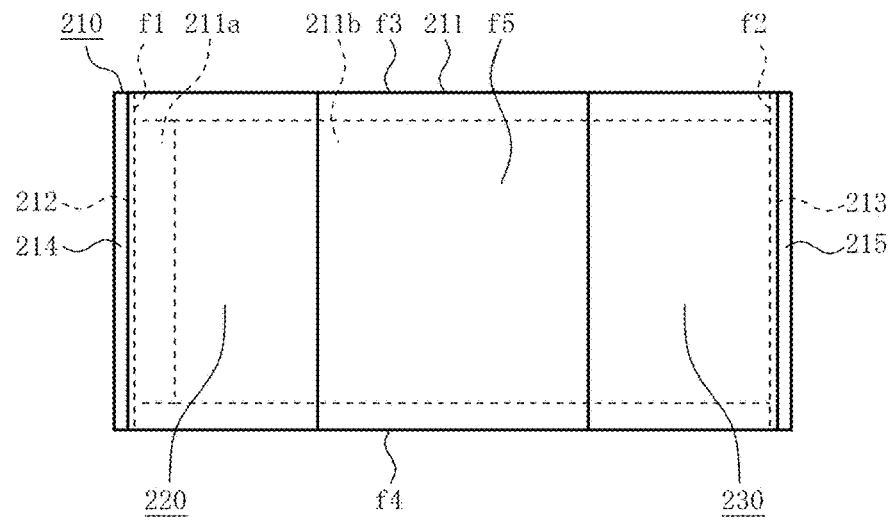
[FIG. 11]
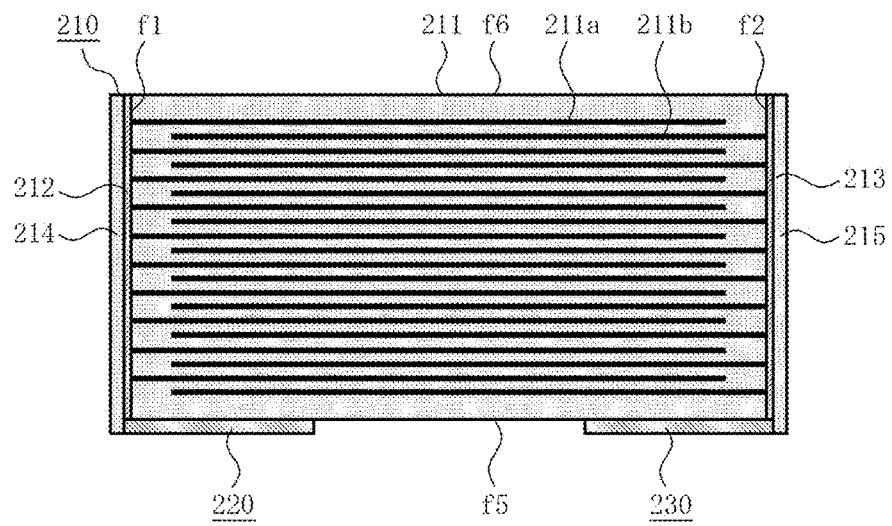
FIG. 12A
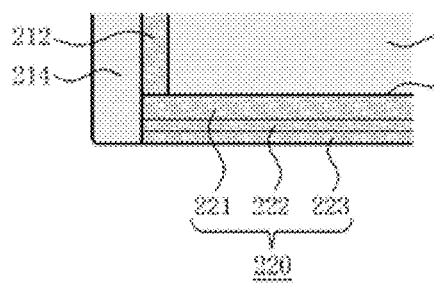
FIG. 12B
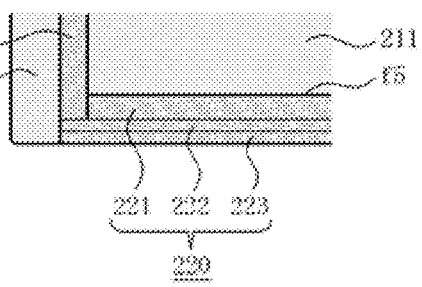

MULTILAYER CERAMIC CAPACITOR HAVING EXTERNAL ELECTRODES PROVIDED ON BOTTOM FACE AND CONDUCTOR AND COVER LAYERS PROVIDED ON FRONT AND REAR FACES

BACKGROUND

Field of the Invention

The present invention relates to a multilayer ceramic capacitor comprising a capacitor body of roughly rectangular solid shape, as well as a first external electrode and a second external electrode that are provided on one height-direction face thereof.

Description of the Related Art

FIGS. 1 to 7 of Patent Literature 1 mentioned below disclose a multilayer ceramic capacitor relating to the foregoing. This multilayer ceramic capacitor comprises: a capacitor body of roughly rectangular solid shape, which contains multiple first internal electrode layers of roughly rectangular shape and multiple second internal electrode layers of roughly rectangular shape that are arranged alternately, in the width direction, with dielectric layers in between; as well as a first external electrode of roughly rectangular shape and a second external electrode of roughly rectangular shape, which are provided on one height-direction face of the capacitor body. Each first internal electrode layer has a first lead part of roughly rectangular shape that continues to one height-direction face of the capacitor body, and an end of each first lead part is connected to the first external electrode. Each second internal electrode layer has a second lead part of roughly rectangular shape that continues to one height-direction face of the capacitor body, and an end of each second lead part is connected to the second external electrode.

The aforementioned multilayer ceramic capacitor is constructed in such a way that each first internal electrode layer and each second internal electrode layer are oriented at roughly right angles with the first external electrode and second external electrode, and consequently the length-direction dimension (width) of each first lead part is smaller than the height-direction dimension (width) of each first internal electrode layer, while the length-direction dimension (width) of each second lead part is smaller than the height-direction dimension (width) of each second internal electrode layer. Accordingly, an attempt to meet the demand for size reduction and capacitance increase based on the aforementioned multilayer ceramic capacitor raises the concern that the connection of each first lead part with the first external electrode, and the connection of each second lead part with the second external electrode, may become unstable.

To be specific, meeting the demand for size reduction and capacitance increase based on the aforementioned multilayer ceramic capacitor requires decreasing the height-direction dimension (width) and length-direction dimension of each first internal electrode layer, as well as the height-direction dimension (width) and length-direction dimension of each second internal electrode layer; however, the length-direction dimension (width) of each first lead part, and the length-direction dimension (width) of each second lead part, become extremely small when, in particular, the length-direction dimension decreases, and this tends to make the connection of each first lead part with the first external electrode, and the connection of each second lead part with the second external electrode, unstable.

BACKGROUND ART LITERATURES

[Patent Literature 1] Japanese Patent Laid-open No. 2014-116571

SUMMARY

An object of the present invention is to provide a multilayer ceramic capacitor comprising a capacitor body of roughly rectangular solid shape, as well as a first external electrode and a second external electrode that are provided on one height-direction face thereof; wherein such multilayer ceramic capacitor can achieve reliable connection with respect to the connection of each first internal electrode layer to the first external electrode, and also with respect to the connection of each second internal electrode layer to the second external electrode, even when meeting the demand for size reduction and capacitance increase.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor pertaining to the present invention is a multilayer ceramic capacitor comprising a capacitor body of roughly rectangular solid shape, as well as a first external electrode of roughly rectangular shape and a second external electrode of roughly rectangular shape that are provided on one height-direction face thereof, wherein: the capacitor body comprises (1) a capacitive element of roughly rectangular solid shape, which contains multiple first internal electrode layers of roughly rectangular shape and multiple second internal electrode layers of roughly rectangular shape that are arranged alternately with dielectric layers in between, (2) a first conductor layer covering one length-direction face of the capacitive element, (3) a second conductor layer covering the other length-direction face of the capacitive element, (4) a first cover layer covering the exterior face of the first conductor layer, and (5) a second cover layer covering the exterior face of the second conductor layer; one length-direction ends of the multiple first internal electrode layers are connected to the first conductor layer over connection widths that are equivalent to the respective widths of the multiple first internal electrode layers; the other length-direction ends of the multiple second internal electrode layers are connected to the second conductor layer over connection widths that are equivalent to the respective widths of the multiple second internal electrode layers; one height-direction end of the first conductor layer is connected to the first external electrode over a connection width equivalent to the width of the first conductor layer; and one height-direction end of the second conductor layer is connected to the second external electrode over a connection width equivalent to the width of the second conductor layer.

According to the present invention, a multilayer ceramic capacitor comprising a capacitor body of roughly rectangular solid shape, as well as a first external electrode and a second external electrode that are provided on one height-direction face thereof, can be provided; wherein such multilayer ceramic capacitor can achieve reliable connection with respect to the connection of each first internal electrode layer to the first external electrode, and also with respect to the connection of each second internal electrode layer to the second external electrode, even when meeting the demand for size reduction and capacitance increase.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 6A is a drawing corresponding to FIG. 1 showing a first variation example of the multilayer ceramic capacitor shown in FIG. 1, while

FIG. 7A is a drawing corresponding to FIG. 1 showing a second variation example of the multilayer ceramic capacitor shown in FIG. 1, while

FIG. 8 is a view of the multilayer ceramic capacitor pertaining to the second embodiment of the present invention, from the sixth face f6 side of the capacitive element.

FIG. 9 is a view of the multilayer ceramic capacitor shown in FIG. 8, from the third face f3 side of the capacitive element.

FIG. 10 is a view of the multilayer ceramic capacitor shown in FIG. 8, from the fifth face f5 side of the capacitive element.

FIG. 11 is a section view of FIG. 8 along line S4-S4.

FIG. 12A is a partially enlarged view of FIG. 11, while FIG. 12B is a drawing corresponding to FIG. 12A showing a condition where the base film of the external electrode is embodied differently than in FIG. 12A.

FIG. 13A is a drawing corresponding to FIG. 8 showing a first variation example of the multilayer ceramic capacitor shown in FIG. 8, while

FIG. 14A is a drawing corresponding to FIG. 8 showing a second variation example of the multilayer ceramic capacitor shown in FIG. 8, while

DESCRIPTION OF THE SYMBOLS

110—Capacitor body, 111—Capacitive element, 111a, 111a'—First internal electrode layer, 111b, 111b'—Second internal electrode layer, 112—First conductor layer, 113—Second conductor layer, 114—First cover layer, 114a—Extending part of the first cover layer, 115—Second cover layer, 115a—Extending part of the second cover layer, 120—First external electrode, 130—Second external electrode, 210—Capacitor body, 211—Capacitive element, 211a, 211a'—First internal electrode layer, 211b, 211b'—Second internal electrode layer, 212—First conductor layer, 213—Second conductor layer, 214—First cover layer, 214a—Extending part of the first cover layer, 215—Second cover layer, 215a—Extending part of the second cover layer, 220—First external electrode, 230—Second external electrode.

DETAILED DESCRIPTION OF EMBODIMENTS

First Embodiment

Figure 1:
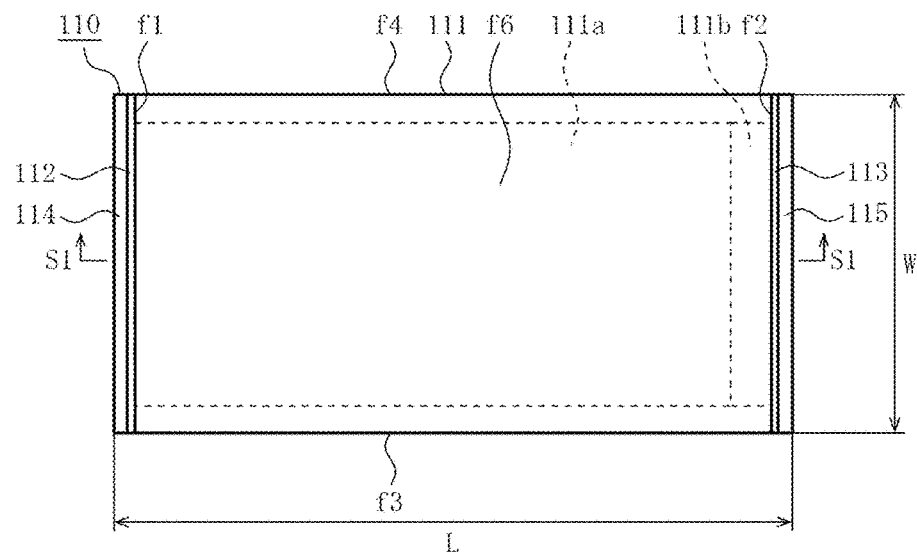
FIG. 1 is a view of the multilayer ceramic capacitor pertaining to the first embodiment of the present invention, from the sixth face f6 side of the capacitive element.
Figure 2:
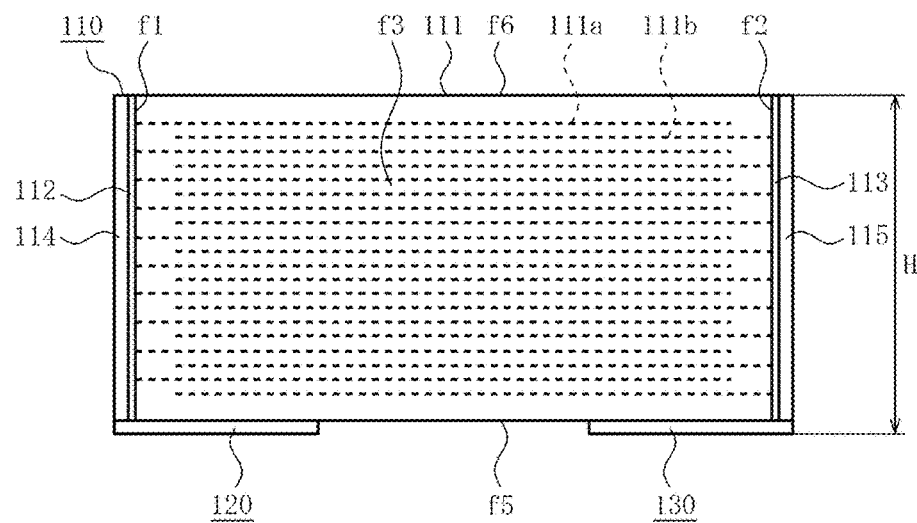
FIG. 2 is a view of the multilayer ceramic capacitor shown in FIG. 1, from the third face f3 side of the capacitive element.
Figure 3:
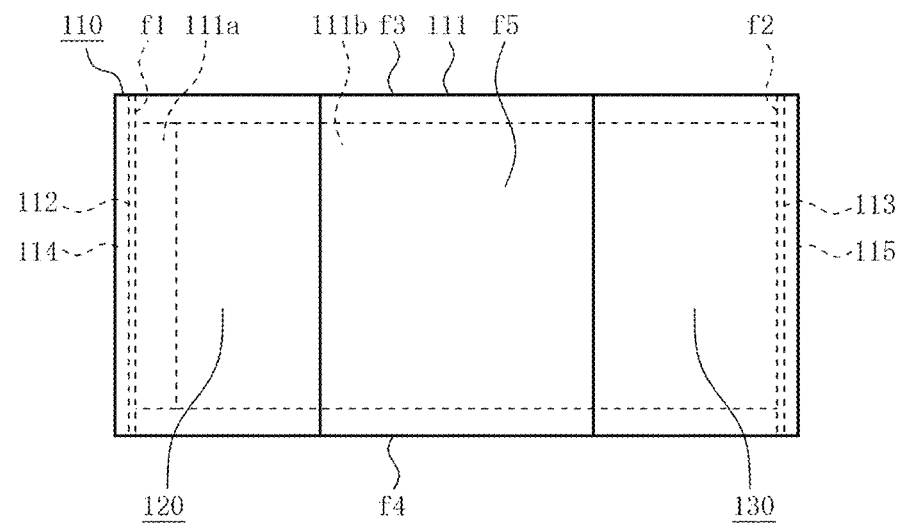
FIG. 3 is a view of the multilayer ceramic capacitor shown in FIG. 1, from the fifth face f5 side of the capacitive element.
Figure 4:
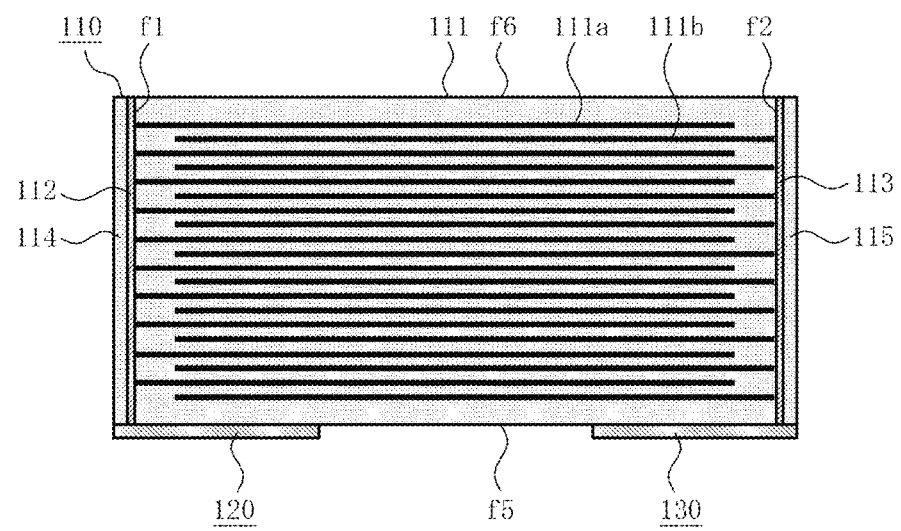
FIG. 4 is a section view of FIG. 1 along line S/I-S/I.

First, the construction of the multilayer ceramic capacitor pertaining to the first embodiment of the present invention is explained using FIGS. 1 to 5. In this explanation, the left/right direction in FIG. 1 represents the length direction, the up/down direction in FIG. 1 represents the width direction, and the up/down direction in FIG. 2 represents the height direction, while the dimensions of each component in the length direction, width direction and height direction represent the length, width, and height of the component, respectively.

This multilayer ceramic capacitor comprises a capacitor body 110 of roughly rectangular solid shape, as well as a first external electrode 120 of roughly rectangular shape and a second external electrode 130 of roughly rectangular shape that are provided on one height-direction face of the capacitor body 110, and its overall dimensions are specified by length L, width W, and height H. Incidentally, the length L, width W, and height H of the multilayer ceramic capacitor shown in FIGS. 1 to 5 are 1000 µm, 500 µm, and 500 µm, respectively, or 600 µm, 300 µm, and 300 µm, respectively, for example. It should be noted that, while a multilayer ceramic capacitor whose length L, width W, and height H meet the condition of "Length L>Width W=Height H" is depicted in FIGS. 1 to 5, the relationship of length L, width W, and height H may be "Length L>Width W>Height H" or "Length L>Height H>Width W," or it may also be "Width W>Length L=Height H," "Width W>Length L>Height H," or "Width W>Height H>Length L."

The capacitor body 110 is constituted by a capacitive element 111, a first conductor layer 112, a second conductor layer 113, a first cover layer 114, and a second cover layer 115.

The capacitive element 111 is roughly a rectangular solid in shape, and has a first face f1 and a second face f2 facing each other in the length direction, a third face f3 and a fourth face f4 facing each other in the width direction, and a fifth face f5 and a sixth face f6 facing each other in the height direction. Also, the capacitive element 111 contains multiple first internal electrode layers 111a of roughly rectangular shape and multiple second internal electrode layers 111b of roughly rectangular shape that are arranged alternately, in the height direction, with dielectric layers (not accompanied by symbol) in between. The width, length, and thickness of each first internal electrode layer 111a are roughly the same as the width, length, and thickness of each second internal electrode layer 111b, while each dielectric layer has roughly the same thickness. Incidentally, the thickness of each first internal electrode layer 111a and that of each second internal electrode layer 111b are set in a range of 0.5 to 2 μm, for example, while the thickness of each dielectric layer is set in a range of 0.5 to 2 μm, for example. It should be noted that, while 10 first internal electrode layers 111a and 10 second internal electrode layers 111b are depicted in FIGS. 1 to 5, this is for the purpose of illustration and the number of first internal electrode layers 111a and that of second internal electrode layers 111b may be 11 or more.

For the capacitive element 111, except for each first internal electrode layer 111a and each second internal electrode layer 111b, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, may be used. Also, for each first internal electrode layer 111a and each second internal electrode layer 111b, a good conductor whose primary component is nickel, copper, palladium, platinum, silver, gold, or alloy thereof, etc., may be used.

The first conductor layer 112 is roughly rectangular in shape, and is in contact with and covers the first face f1 of the capacitive element 111. The width and height of the first conductor layer 112 are roughly the same as the width and height of the first face f1. Because it relates to the length of the capacitor body 110, desirably the thickness of the first conductor layer 112 is as thin as possible. Incidentally, the thickness of the first conductor layer 112 is set in a range of one to five times the thickness of the first internal electrode layer 111a, or preferably in a range of 0.5 to 5 μm, for example. Also, for the first conductor layer 112, a good conductor whose primary component is nickel, copper, palladium, platinum, silver, gold, or alloy thereof, etc., or preferably a good conductor whose primary component is the same as the primary component of the first internal electrode layer 111a, may be used. To this first conductor layer 112, one length-direction end of each first internal electrode layer 111a is connected over a connection width equivalent to the width of each first internal electrode layer 111a. It should be noted that, while the connection width of one length-direction end of each first internal electrode layer 111a to the first conductor layer 112 is ideally the width of each first internal electrode layer 111a, in reality the width of one length-direction end of each first internal electrode layer 111a was confirmed to vary by approx. ±5% of the width of each first internal electrode layer 111a, and therefore the expression "connection width equivalent to the width of each first internal electrode layer 111a" is intentionally used here, instead of "connection width identical to the width of each first internal electrode layer 111a."

The second conductor layer 113 is roughly rectangular in shape, and is in contact with and covers the second face f2 of the capacitive element 111. The width and height of the second conductor layer 113 are roughly the same as the width and height of the second face f2. Because it relates to the length of the capacitor body 110, desirably the thickness of the second conductor layer 113 is as thin as possible. Incidentally, the thickness of the second conductor layer 113 is set in a range of one to five times the thickness of the second internal electrode layer 111b, or preferably in a range of 0.5 to 5 μm, for example. Also, for the second conductor layer 113, a good conductor whose primary component is nickel, copper, palladium, platinum, silver, gold, or alloy thereof, etc., or preferably a good conductor whose primary component is the same as the primary component of the second internal electrode layer 111b, may be used. To this second conductor layer 113, the other length-direction end of each second internal electrode layer 111b is connected over a connection width equivalent to the width of each second internal electrode layer 111b. It should be noted that, while the connection width of the other length-direction end of each second internal electrode layer 111b to the second conductor layer 113 is ideally the width of each second internal electrode layer 111b, in reality the width of the other length-direction end of each second internal electrode layer 111b was confirmed to vary by approx. ±5% of the width of each second internal electrode layer 111b, and therefore the expression "connection width equivalent to the width of each second internal electrode layer 111b" is intentionally used here, instead of "connection width identical to the width of each second internal electrode layer 111b."

The first cover layer 114 is roughly rectangular in shape, and is in contact with and covers the exterior face of the first conductor layer 112. The width and height of the first cover layer 114 are roughly the same as the width and height of the exterior face of the first conductor layer 112. Because it relates to the length of the capacitor body 110, desirably the thickness of the first cover layer 114 is as thin as possible. Incidentally, the thickness of the first cover layer 114 is set in a range of one to 10 times the thickness of the dielectric layer present between the first internal electrode layer 111a and second internal electrode layer 111b, or preferably in a range of 1 to 10 μm (typically thicker than the first conductor layer 112), for example. Also, for the first cover layer 114, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, or more preferably a dielectric ceramic whose primary component is the same as the primary component of the capacitive element 111 except for the first internal electrode layer 111a and second internal electrode layer 111b, may be used.

The second cover layer 115 is roughly rectangular in shape, and is in contact with and covers the exterior face of the second conductor layer 113. The width and height of the second cover layer 115 are roughly the same as the width and height of the exterior face of the second conductor layer 113. Because it relates to the length of the capacitor body 110, desirably the thickness of the second cover layer 115 is as thin as possible. Incidentally, the thickness of the second cover layer 115 is set in a range of one to 10 times the thickness of the dielectric layer present between the first internal electrode layer 111a and second internal electrode layer 111b, or preferably in a range of 1 to 10 μm (typically thicker than the second conductor layer 113), for example, or more preferably roughly the same as the thickness of the first cover layer 114. Also, for the second cover layer 115, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, or more preferably a dielectric ceramic whose primary component is the same as the primary component of the capacitive element 111 except for the first internal electrode layer 111a and second internal electrode layer 111b, may be used.

The first external electrode 120 is roughly rectangular in shape, and provided in contact with the first cover layer 114 side of the fifth face f5 of the capacitive element 111 corresponding to one height-direction face of the capacitor body 110. The width of the first external electrode 120 is roughly the same as the width of the fifth face f5 of the capacitive element 111, while its length is set in a range of one-eighth to one-third the length L of the multilayer ceramic capacitor, for example, and its thickness is set in a range of 1 to 15 μm (typically thicker than the first conductor layer 112), for example. Also, one length-direction end of the first external electrode 120 reaches below the exterior face of the first cover layer 114. To this first external electrode 120, one height-direction end of the first conductor layer 112 is connected over a connection width equivalent to the width of the first conductor layer 112. It should be noted that, while the connection width of one height-direction end of the first conductor layer 112 to the first external electrode 120 is ideally the width of the first conductor layer 112, in reality the width of one height-direction end of the first conductor layer 112 was confirmed to vary by approx. ±5% of the width of the first conductor layer 112, and therefore the expression "connection width equivalent to the width of the first conductor layer 112" is intentionally used here, instead of "connection width identical to the width of the first conductor layer 112."

The second external electrode 130 is roughly rectangular in shape, and provided in contact with the second cover layer 115 side of the fifth face f5 of the capacitive element 111 corresponding to one height-direction face of the capacitor body 110. The width of the second external electrode 130 is roughly the same as the width of the fifth face f5 of the capacitive element 111, while its length is set in a range of one-eighth to one-third the length L of the multilayer ceramic capacitor, for example, and its thickness is set in a range of 1 to 15 μm (typically thicker than the second conductor layer 113), for example. Also, the other length-direction end of the second external electrode 130 reaches below the exterior face of the second cover layer 115. To this second external electrode 130, one height-direction end of the second conductor layer 113 is connected over a connection width equivalent to the width of the second conductor layer 113. It should be noted that, while the connection width of one height-direction end of the second conductor layer 113 to the second external electrode 130 is ideally the width of the second conductor layer 113, in reality the width of one height-direction end of the second conductor layer 113 was confirmed to vary by approx. ±5% of the width of the second conductor layer 113, and therefore the expression "connection width equivalent to the width of the second conductor layer 113" is intentionally used here, instead of "connection width identical to the width of the second conductor layer 113."

Figure 5:
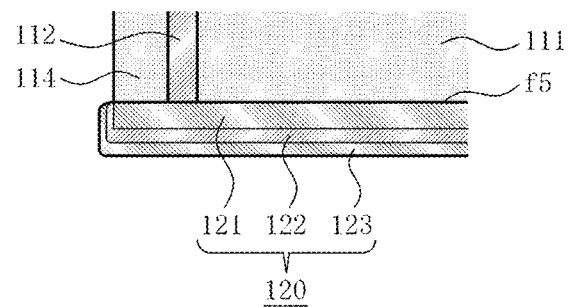
FIG. 5 is a partially enlarged view of FIG. 4.

Here, the embodiment of the first external electrode 120 and second external electrode 130 is supplemented using FIG. 5. It should be noted that, while FIG. 5 only depicts the first external electrode 120, the second external electrode 130 is also embodied in the same manner as in FIG. 5.

The first external electrode 120 shown in FIG. 5 has a three-layer structure primarily consisting of a base film 121 contacting the fifth face f5 of the capacitive element 111, an intermediate film 122 contacting the exterior face of the base film 121, and a surface film 123 contacting the exterior face of the intermediate film 122. It should be noted that the first external electrode 120 and second external electrode 130 need not have a three-layer structure; instead, they can have a two-layer structure having no intermediate film 122, a multi-layer structure having two or more intermediate films 122, or a single-layer structure having only a surface film 123.

When an example based on a three-layer structure is explained, the base film 121 is constituted by a baked film, for example, and for this baked film, preferably a good conductor whose primary component is nickel, copper, palladium, platinum, silver, gold, or alloy thereof, etc., may be used. The intermediate film 122 is constituted by a plating film, for example, and for this plating film, preferably a good conductor whose primary component is platinum, palladium, gold, copper, nickel, or alloy thereof, etc., may be used. The surface film 123 is constituted by a plating film, for example, and for this plating film, preferably a good conductor whose primary component is copper, tin, palladium, gold, zinc, or alloy thereof, etc., may be used.

Next, an example of manufacturing method appropriate for the aforementioned multilayer ceramic capacitor is explained by using, as deemed appropriate, the symbols, etc., shown in FIGS. 1 to 5.

For the manufacture, a ceramic slurry containing dielectric ceramic powder, organic binder, organic solvent and various additives, and an electrode paste containing good conductor powder, organic binder, organic solvent, and various additives, are prepared.

Next, the ceramic slurry is coated on the surface of a carrier film and then dried to produce a first sheet. The electrode paste is printed on the surface of such first sheet and then dried to produce a second sheet on which internal electrode layer patterns are formed.

Next, a specified number of unit sheets taken from the first sheet are stacked and thermally compressed one by one, to form an area corresponding to one height-direction margin of the capacitive element 111. Next, a specified number of unit sheets (including internal electrode layer patterns) taken from the second sheet are stacked and thermally compressed one by one, to form an area corresponding to the part of the capacitive element 111 where the first internal electrode layers 111a and second internal electrode layers 111b are present. Next, a specified number of unit sheets taken from the first sheet are stacked and thermally compressed one by one, to form an area corresponding to the other height-direction margin of the capacitive element 111. Lastly, the entire laminate is thermally compressed for one last time to produce an unsintered sheet.

Next, the unsintered sheet is cut into a grid to produce unsintered elements, each corresponding to the capacitive element 111. Next, the many unsintered elements are aligned in the same orientation, and then an unsintered conductor layer corresponding to the first conductor layer 112, and an unsintered cover layer corresponding to the first cover layer 114, are formed on one length-direction face of each unsintered element, after which they are reversed and an unsintered conductor layer corresponding to the second conductor layer 113, and an unsintered cover layer corresponding to the second cover layer 115, are formed on the other length-direction face of each unsintered element. This way, an unsintered body corresponding to the capacitor body 110 is produced.

For the method to produce the unsintered conductor layer and unsintered cover layer, preferably, the following methods can be used: (w1) a method whereby a conductor layer paste is applied, dip-coated, or printed on both length-direction faces of an unsintered element and then dried, after which a separately prepared dielectric layer sheet is pressed on and attached to the unsintered element; (w2) a method whereby a conductor paste is coated or printed on a separately prepared dielectric layer sheet and then dried, after which it is pressed on and attached to both length-direction faces of an unsintered element; or (w3) a method whereby a conductor layer paste is applied, dip-coated, or printed on both length-direction faces of an unsintered element and then dried, after which a dielectric layer slurry is applied, dip-coated, or printed on top and then dried, may be adopted.

For the aforementioned conductor layer paste, the same paste as the aforementioned electrode paste, or a paste identical to the aforementioned electrode paste except for the type of good conductor powder, or a paste that only contains good conductor powder, organic binder, and organic solvent, may be used. Also, for the aforementioned dielectric layer sheet, a sheet produced by applying and then drying the same slurry as the aforementioned ceramic slurry, or a sheet produced by applying and then drying a slurry identical to the aforementioned ceramic slurry except for the type of dielectric ceramic powder, may be used. Furthermore, for the aforementioned dielectric layer slurry, the same slurry as the aforementioned ceramic slurry, or a slurry identical to the aforementioned ceramic slurry except for the type of dielectric ceramic powder, may be used.

Next, many unsintered bodies are sintered (including binder removal and sintering) all at once in an ambience and at a temperature profile appropriate for the dielectric ceramic powder and good conductor powder contained therein, after which the many sintered bodies are barreled, as necessary. This way, capacitor bodies 110 are produced.

Next, the many capacitor bodies 110 are aligned in the same orientation, after which an electrode paste (the same paste as the aforementioned electrode paste or a paste identical to the aforementioned electrode paste except for the type of good conductor powder) is applied or printed on one height-direction face of each capacitor body 110, and then dried and baked, to form a base film 121. Next, an intermediate film 122 covering the base film 121, and a surface film 123, are formed by means of plating, to produce a first external electrode 120 and a second external electrode 130.

Next, the effects (effects e1 to e3) achieved by the aforementioned multilayer ceramic capacitor are explained.

(e1) The capacitor body 110 comprises: (1) a capacitive element 111 of roughly rectangular solid shape, which contains multiple first internal electrode layers 111a of roughly rectangular shape and multiple second internal electrode layers 111b of roughly rectangular shape that are arranged alternately with dielectric layers in between; (2) a first conductor layer 112 covering one length-direction face of the capacitive element 111; (3) a second conductor layer 113 covering the other length-direction face of the capacitive element 111; (4) a first cover layer 114 covering the exterior face of the first conductor layer 112; and (5) a second cover layer 115 covering the exterior face of the second conductor layer 113. Also, one length-direction ends of the multiple first internal electrode layers 111a are connected to the first conductor layer 112 over connection widths that are equivalent to the respective widths of the multiple first internal electrode layers 111a, while the other length-direction ends of the multiple second internal electrode layers 111b are connected to the second conductor layer 113 over connection widths that are equivalent to the respective widths of the multiple second internal electrode layers 111b, and also, one height-direction end of the first conductor layer 112 is connected to the first external electrode 120 over a connection width equivalent to the width of the first conductor layer 112, while one height-direction end of the second conductor layer 113 is connected to the second external electrode 130 over a connection width equivalent to the width of the second conductor layer 113.

In other words, the capacitor body 110 has the first conductor layer 112 whose function is to utilize the width of each first internal electrode layer 111a to connect it to the first external electrode 120, as well as the second conductor layer 113 whose function is to utilize the width of each second internal electrode layer 111b to connect it to the second external electrode 130, and therefore it is possible to maximally prevent the connection of each first internal electrode layer 111a to the first external electrode 120, and the connection of each second internal electrode layer 111b to the second external electrode 130, from becoming unstable even when the width and length of each first internal electrode layer 111a, and the width and length of each second internal electrode layer 111b, are reduced. This means that the multilayer ceramic capacitor comprising the capacitor body 110 of roughly rectangular solid shape, as well as the first external electrode 120 and second external electrode 130 provided on one height-direction face thereof, can achieve reliable connection with respect to the connection of each first internal electrode layer 111a to the first external electrode 120, and also with respect to the connection of each second internal electrode layer 111b to the second external electrode 130, even when meeting the demand for size reduction and capacitance increase.

(e2) The thickness of the first conductor layer 112 and that of the second conductor layer 113, of the capacitor body 110, are set in a range of one to five times the thickness of each of the multiple first internal electrode layers 111a and each of the multiple second internal electrode layers 111b, respectively, and therefore it is possible to maximally prevent the length L of the multilayer ceramic capacitor from increasing due to the thickness of the first conductor layer 112 and that of the second conductor layer 113.

(e3) The thickness of the first cover layer 114 and that of the second cover layer 115, of the capacitor body 110, are set in a range of one to 10 times the thickness of the dielectric layer of the capacitive element 111, and therefore it is possible to maximally prevent the length L of the multilayer ceramic capacitor from increasing due to the thickness of the first cover layer 114 and that of the second cover layer 115.

Next, variation examples (first variation example m1 to fourth variation example m4) of the aforementioned multilayer ceramic capacitor are explained.

Figure 6A:
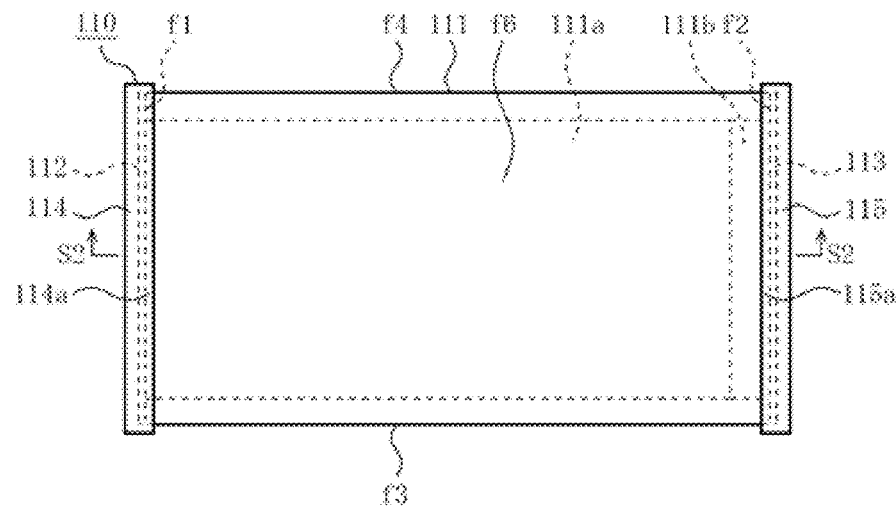
Figure 6B:
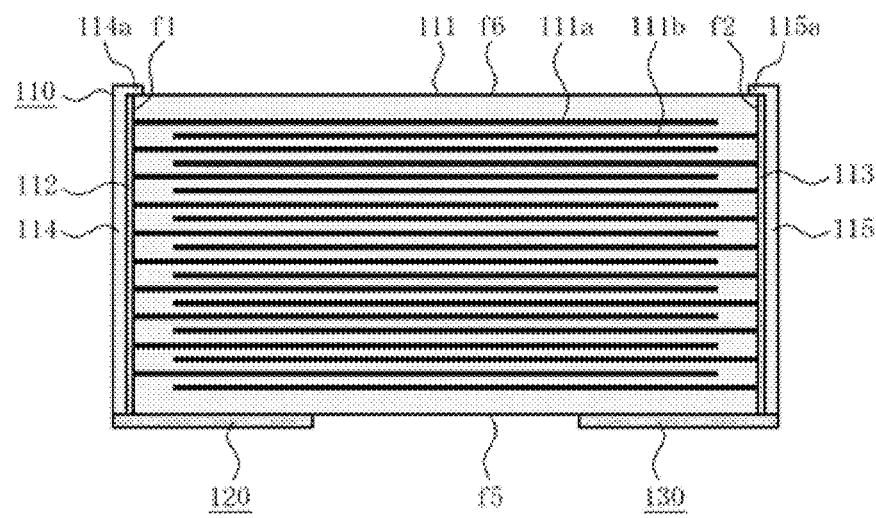
FIG. 6B is a section view of FIG. 6A along line S2-S2.

(m1) As shown in FIGS. 6A and 6B, the periphery of the first conductor layer 112, except for one end connected to the first external electrode 120, may be covered with a part 114a of the first cover layer 114 extending toward the capacitive element 111 side, while the periphery of the second conductor layer 113, except for one end connected to the second external electrode 130, may be covered with a part 115a of the second cover layer 115 extending toward the capacitive element 111 side. This way, another effect can be achieved, which is that the problem of the first conductor layer 112 and second conductor layer 113 contacting and therefore shorting with any conductor line on the circuit board or any adjacent electronic component, etc., can be prevented even when the multilayer ceramic capacitor falls over the circuit board during mounting.

Figure 7A:
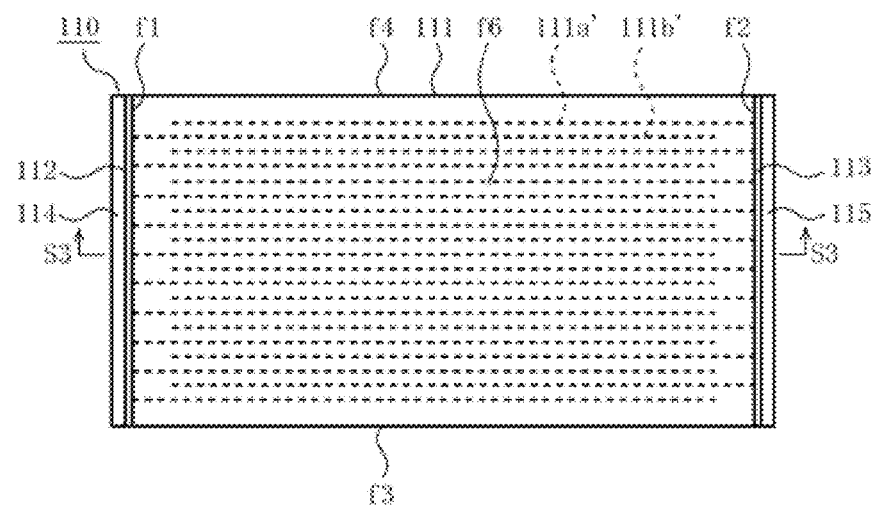
Figure 7B:
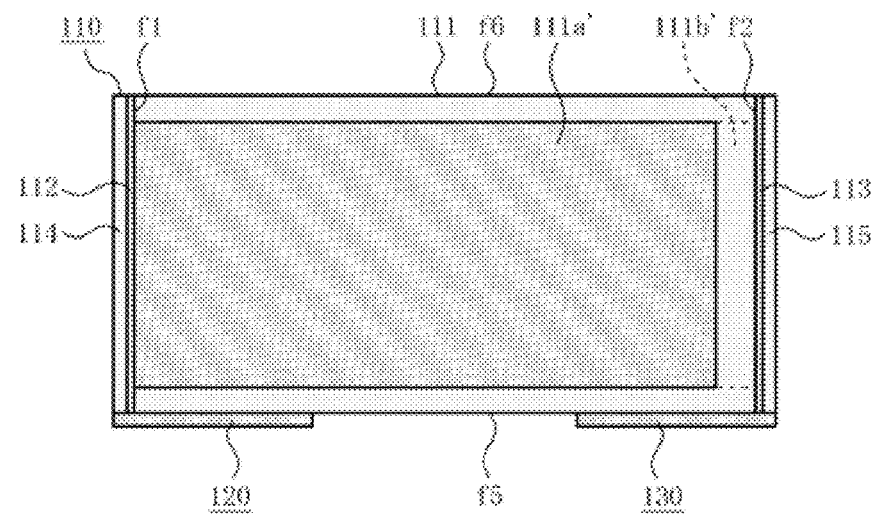
FIG. 7B is a section view of FIG. 7A along line S3-S3.

(m2) As shown in FIGS. 7A and 7B, multiple first internal electrode layers 111a' of roughly rectangular shape and multiple second internal electrode layers 111b' of roughly rectangular shape that are arranged in the width direction with the dielectric layers (not accompanied by symbol) in between may be contained in the capacitive element 111.

This way, effects similar to the aforementioned effects e1 to e3 can be obtained, although each first internal electrode layer 111a' and each second internal electrode layer 111b' are oriented roughly at right angles with the first external electrode 120 and second external electrode 130.

(m3) By preparing the unsintered cover layer described in the aforementioned manufacturing example in such a way that it contains approx. 0.1 to 10 atomic percent of MgO or other oxidization accelerator, metal oxides can be interspersed in the first conductor layer 112 and second conductor layer 113 to be produced in the subsequent sintering process, primarily in the areas bordering the first cover layer 114 and second cover layer 115, respectively, so that consequently the adhesion of the first cover layer 114 to the first conductor layer 112, as well as the adhesion of the second cover layer 115 to the second conductor layer 113, can be increased because of these metal oxides.

(m4) By preparing the unsintered conductor layer described in the aforementioned manufacturing example in such a way that it contains approx. 5 to 50 percent by weight of a dielectric ceramic powder whose primary component is the same as that of the capacitive element 111 except for the first internal electrode layer 111a and second internal electrode layer 111b, the adhesion of the first conductor layer 112 to the capacitive element 111, as well as the adhesion of the second conductor layer 113 to the capacitive element 111, can be increased.

Second Embodiment

First, the construction of the multilayer ceramic capacitor pertaining to the second embodiment of the present invention is explained using FIGS. 8 to 12B. It should be noted that, because the constitution of the capacitive element 211 (including the first internal electrode layer 211a, second internal electrode layer 211b, and dielectric layer) of the multilayer ceramic capacitor pertaining to the second embodiment is the same as the constitution of the capacitive element 111 (including the first internal electrode layer 111a, second internal electrode layer 111b and dielectric layer) of the multilayer ceramic capacitor pertaining to the first embodiment, those points at which the multilayer ceramic capacitor pertaining to the second embodiment differs structurally from the multilayer ceramic capacitor pertaining to the first embodiment are primarily explained here.

This multilayer ceramic capacitor comprises a capacitor body 210 of roughly rectangular solid shape, as well as a first external electrode 220 of roughly rectangular shape and a second external electrode 230 of roughly rectangular shape that are provided on one height-direction face of the capacitor body 210, and its overall dimensions are specified by length L, width W, and height H. The capacitor body 210 is constituted by a capacitive element 211 of roughly rectangular solid shape, a first conductor layer 212, a second conductor layer 213, a first cover layer 214, and a second cover layer 215.

The first conductor layer 212 is roughly rectangular in shape, and is in contact with and covers the first face f1 of the capacitive element 211. The width and height of the first conductor layer 212 are roughly the same as the width and height of the first face f1. Because it relates to the length of the capacitor body 210, desirably the thickness of the first conductor layer 212 is as thin as possible. Incidentally, the thickness of the first conductor layer 212 is set in a range of one to five times the thickness of the first internal electrode layer 211a, or preferably in a range of 0.5 to 5 µm, for example. Also, for the first conductor layer 212, a good conductor whose primary component is nickel, copper, palladium, platinum, silver, gold, or alloy thereof, etc., or preferably a good conductor whose primary component is the same as the primary component of the first internal electrode layer 211a, may be used. To this first conductor layer 212, one length-direction end of each first internal electrode layer 211a is connected over a connection width equivalent to the width of each first internal electrode layer 211a. It should be noted that, while the connection width of one length-direction end of each first internal electrode layer 211a to the first conductor layer 212 is ideally the width of each first internal electrode layer 211a, in reality the width of one length-direction end of each first internal electrode layer 211a was confirmed to vary by approx. ±5% of the width of each first internal electrode layer 211a, and therefore the expression "connection width equivalent to the width of each first internal electrode layer 211a" is intentionally used here, instead of "connection width identical to the width of each first internal electrode layer 211a."

The second conductor layer 213 is roughly rectangular in shape, and is in contact with and covers the second face f2 of the capacitive element 211. The width and height of the second conductor layer 213 are roughly the same as the width and height of the second face f2. Because it relates to the length of the capacitor body 210, desirably the thickness of the second conductor layer 213 is as thin as possible. Incidentally, the thickness of the second conductor layer 213 is set in a range of one to five times the thickness of the second internal electrode layer 211b, or preferably in a range of 0.5 to 5 µm, for example. Also, for the second conductor layer 213, a good conductor whose primary component is nickel, copper, palladium, platinum, silver, gold, or alloy thereof, etc., or preferably a good conductor whose primary component is the same as the primary component of the second internal electrode layer 211b, may be used. To this second conductor layer 213, the other length-direction end of each second internal electrode layer 211b is connected over a connection width equivalent to the width of each second internal electrode layer 211b. It should be noted that, while the connection width of the other length-direction end of each second internal electrode layer 211b to the second conductor layer 213 is ideally the width of each second internal electrode layer 211b, in reality the width of the other length-direction end of each second internal electrode layer 211b was confirmed to vary by approx. ±5% of the width of each second internal electrode layer 211b, and therefore the expression "connection width equivalent to the width of each second internal electrode layer 211b" is intentionally used here, instead of "connection width identical to the width of each second internal electrode layer 211b."

The first cover layer 214 is roughly rectangular in shape, and is in contact with and covers the exterior face of the first conductor layer 212. The width of the first cover layer 214 is roughly the same as the width of the exterior face of the first conductor layer 212, while its height is slightly larger than the height of the exterior face of the first conductor layer 212, where this larger part projects toward the first external electrode 220 side. Because it relates to the length of the capacitor body 210, desirably the thickness of the first cover layer 214 is as thin as possible. Incidentally, the thickness of the first cover layer 214 is set in a range of one to 10 times the thickness of the dielectric layer present between the first internal electrode layer 211a and second internal electrode layer 211b, or preferably in a range of 1 to 10 µm, for example. Also, for the first cover layer 214, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, or more preferably a dielectric ceramic whose primary component is the same as the primary component of the capacitive element 211 except for the first internal electrode layer 211a and second internal electrode layer 211b, may be used.

The second cover layer 215 is roughly rectangular in shape, and is in contact with and covers the exterior face of the second conductor layer 213. The width of the second cover layer 215 is roughly the same as the width of the exterior face of the second conductor layer 213, while its height is slightly larger than the height of the exterior face of the second conductor layer 213, where this larger part projects toward the second external electrode 230 side. Because it relates to the length of the capacitor body 210, desirably the thickness of the second cover layer 215 is as thin as possible. Incidentally, the thickness of the second cover layer 215 is set in a range of one to 10 times the thickness of the dielectric layer present between the first internal electrode layer 211a and second internal electrode layer 211b, or preferably in a range of 1 to 10 µm, for example, or more preferably roughly the same as the thickness of the first cover layer 214. Also, for the second cover layer 215, a dielectric ceramic whose primary component is barium titanate, strontium titanate, calcium titanate, magnesium titanate, calcium zirconate, calcium zirconate titanate, barium zirconate, titanium oxide, etc., or preferably a high dielectric ceramic whose specific dielectric constant is 1000 or higher, or more preferably a dielectric ceramic whose primary component is the same as the primary component of the capacitive element 211 except for the first internal electrode layer 211a and second internal electrode layer 211b, may be used.

The first external electrode 220 is roughly rectangular in shape, and provided in contact with the first cover layer 214 side of the fifth face f5 of the capacitive element 211 corresponding to one height-direction face of the capacitor body 210. The width of the first external electrode 220 is roughly the same as the width of the fifth face f5 of the capacitive element 211, while its length is set in a range of one-eighth to one-third the length L of the multilayer ceramic capacitor, for example, and its thickness is set in a range of 1 to 15 µm, for example. Also, one length-direction end of the first external electrode 220 reaches below the interior face of the first cover layer 214, and contacts the interior face of the first cover layer 214 at one height-direction end (part projecting toward the first external electrode 220 side). To this first external electrode 220, one height-direction end of the first conductor layer 212 is connected over a connection width equivalent to the width of the first conductor layer 212. It should be noted that, while the connection width of one height-direction end of the first conductor layer 212 to the first external electrode 220 is ideally the width of the first conductor layer 212, in reality the width of one height-direction end of the first conductor layer 212 was confirmed to vary by approx. ±5% of the width of the first conductor layer 212, and therefore the expression "connection width equivalent to the width of the first conductor layer 212" is intentionally used here, instead of "connection width identical to the width of the first conductor layer 212."

The second external electrode 230 is roughly rectangular in shape, and provided in contact with the second cover layer 215 side of the fifth face f5 of the capacitive element 211 corresponding to one height-direction face of the capacitor body 210. The width of the second external electrode 230 is roughly the same as the width of the fifth face f5 of the capacitive element 211, while its length is set in a range of one-eighth to one-third the length L of the multilayer ceramic capacitor, for example, and its thickness is set in a range of 1 to 15 µm, for example. Also, the other length-direction end of the second external electrode 230 reaches below the interior face of the second cover layer 215, and contacts the interior face of the second cover layer 215 at one height-direction end (part projecting toward the second external electrode 230 side). To this second external electrode 230, one height-direction end of the second conductor layer 213 is connected over a connection width equivalent to the width of the second conductor layer 213. It should be noted that, while the connection width of one height-direction end of the second conductor layer 213 to the second external electrode 230 is ideally the width of the second conductor layer 213, in reality the width of one height-direction end of the second conductor layer 213 was confirmed to vary by approx. ±5% of the width of the second conductor layer 213, and therefore the expression "connection width equivalent to the width of the second conductor layer 213" is intentionally used here, instead of "connection width identical to the width of the second conductor layer 213."

Here, the embodiment of the first external electrode 220 and second external electrode 230 is supplemented using FIG. 12A. It should be noted that, while FIG. 12A only depicts the first external electrode 220, the second external electrode 230 is also embodied in the same manner as in FIG. 12A.

The first external electrode 220 shown in FIG. 12A has a three-layer structure primarily consisting of a base film 221 contacting the fifth face f5 of the capacitive element 211, an intermediate film 222 contacting the exterior face of the base film 221, and a surface film 223 contacting the exterior face of the intermediate film 222. It should be noted that the first external electrode 220 and second external electrode 230 need not have a three-layer structure; instead, they can have a two-layer structure having no intermediate film 222, a multi-layer structure having two or more intermediate films 222, or a single-layer structure having only a surface film 223.

When an example based on a three-layer structure is explained, the base film 221 is constituted by a baked film, for example, and for this baked film, preferably a good conductor whose primary component is nickel, copper, palladium, platinum, silver, gold, or alloy thereof, etc., may be used. The intermediate film 222 is constituted by a plating film, for example, and for this plating film, preferably a good conductor whose primary component is platinum, palladium, gold, copper, nickel, or alloy thereof, etc., may be used. The surface film 223 is constituted by a plating film, for example, and for this plating film, preferably a good conductor whose primary component is copper, tin, palladium, gold, zinc, or alloy thereof, etc., may be used.

Next, an example of manufacturing method appropriate for the aforementioned multilayer ceramic capacitor is explained by using, as deemed appropriate, the symbols, etc., shown in FIGS. 8 to 12B.

For the manufacture, a ceramic slurry containing dielectric ceramic powder, organic binder, organic solvent, and various additives, and an electrode paste containing good conductor powder, organic binder, organic solvent, and various additives, are prepared.

Next, the ceramic slurry is coated on the surface of a carrier film and then dried to produce a first sheet, while the electrode paste is printed on the surface of such first sheet and then dried to produce a second sheet on which internal electrode layer patterns are formed.

Next, a specified number of unit sheets taken from the first sheet are stacked and thermally compressed one by one, to form an area corresponding to one height-direction margin of the capacitive element 211. Next, a specified number of unit sheets (including internal electrode layer patterns) taken from the second sheet are stacked and thermally compressed one by one, to form an area corresponding to the part of the capacitive element 211 where the first internal electrode layers 211a and second internal electrode layers 211b are present. Next, a specified number of unit sheets taken from the first sheet are stacked and thermally compressed one by one, to form an area corresponding to the other height-direction margin of the capacitive element 211. Lastly, the entire laminate is thermally compressed for one last time to produce an unsintered sheet.

Next, the unsintered sheet is cut into a grid to produce unsintered elements, each corresponding to the capacitive element 211. Next, the many unsintered elements are aligned in orientation and an unsintered conductor layer corresponding to the first conductor layer 212 is formed on one length-direction face of each unsintered element, after which they are reversed and an unsintered conductor layer corresponding to the second conductor layer 213 is formed on the other length-direction face of each unsintered element. Next, an unsintered base film corresponding to the base film of the first external electrode 220, and an unsintered base film corresponding to the base film of the second external electrode 230, are formed on the one height-direction face of each unsintered element on which unsintered conductor layers have been produced. Next, the unsintered elements on which unsintered base films have been produced are aligned in orientation and an unsintered cover layer corresponding to the first cover layer 214 is formed on one length-direction face of each unsintered element, after which they are reversed and an unsintered cover layer corresponding to the second cover layer 215 is formed on the other length-direction face of each unsintered element. This way, an unsintered body corresponding to the capacitor body 210, and on which unsintered base films have been formed, is produced.

For the method to produce the unsintered conductor layer, preferably a method whereby a conductor layer paste is applied, dip-coated, or printed on both length-direction faces of an unsintered element and then dried, may be adopted. Also, for the method to produce the unsintered base film, preferably a method whereby an electrode paste (the same paste as the aforementioned electrode paste or a paste identical to the aforementioned electrode paste except for the type of good conductor powder) is coated or printed on one height-direction face of an unsintered element and then dried, may be adopted. Furthermore, for the method to produce the unsintered cover layer, preferably a method whereby separately prepared dielectric layer sheets are pressed on and attached to the unsintered conductor layer and unsintered base film, or a method whereby a dielectric layer slurry is applied, dip-coated, or printed on the unsintered conductor layer and unsintered base film and then dried, may be adopted.

It should be noted that, by using a third sheet on which base film patterns have been formed and producing, in the aforementioned unsintered sheet production process, an unsintered sheet constituted by this third sheet which is oriented in such a way that the base film patterns face the outside, an unsintered element having an unsintered base film can be obtained in the aforementioned cutting process, and this way the aforementioned production of unsintered base film can be omitted. In this case, the base film 221 on the first external electrode 220 is embodied as shown in FIG. 12B (the base film of the second external electrode 230 which is not illustrated, is also embodied in the same manner).

In addition, while FIGS. 11 to 12B show that one length-direction end of the first external electrode 220 is covered by one height-direction end of the first cover layer 214 and the other length-direction end of the second external electrode 230 is covered by one height-direction end of the second cover layer 215, one length-direction end of the first external electrode 220 need not be covered by one height-direction end of the first cover layer 214 and the other length-direction end of the second external electrode 230 need not be covered by one height-direction end of the second cover layer 215, so long as one height-direction end of the first cover layer 214 reaches one length-direction end of the first external electrode 220 and one height-direction end of the second cover layer 215 reaches the other length-direction end of the second external electrode 230. In other words, one length direction end of the first external electrode 220 may be covered by one height-direction end of the first cover layer 214 and the other length-direction end of the second external electrode 230 may be covered by one height-direction end of the second cover layer 215, in such a way that the exterior side of the first external electrode 220 in the thickness direction and the exterior side of the second external electrode 230 in the thickness direction, such as the intermediate film 222 and surface film 223 shown in FIGS. 12A and 12B, are exposed.

For the aforementioned conductor layer paste, the same paste as the aforementioned electrode paste or a paste identical to the aforementioned electrode paste except for the type of good conductor powder, or a paste that only contains good conductor powder, organic binder, and organic solvent, may be used. Also, for the aforementioned dielectric layer sheet, a sheet produced by applying and then drying the same slurry as the aforementioned ceramic slurry, or a sheet produced by applying and then drying a slurry identical to the aforementioned ceramic slurry except for the type of dielectric ceramic powder, may be used. Furthermore, for the aforementioned dielectric layer slurry, the same slurry as the aforementioned ceramic slurry, or a slurry identical to the aforementioned ceramic slurry except for the type of dielectric ceramic powder, may be used.

Next, many unsintered bodies having unsintered base film are sintered (including binder removal and sintering) all at once in an ambience and at a temperature profile appropriate for the dielectric ceramic powder and good conductor powder contained therein, after which the many sintered bodies are barreled, as necessary. This way, capacitor bodies 210 with base film are produced.

Next, an intermediate film 222 covering the base film 221, and a surface film 223, are formed by means of plating, to produce a first external electrode 220 and a second external electrode 230.

Next, the effects (effects e11 to e13) achieved by the aforementioned multilayer ceramic capacitor are explained.

(e11) The capacitor body 210 comprises: (1) a capacitive element 211 of roughly rectangular solid shape, which contains multiple first internal electrode layers 211a of roughly rectangular shape and multiple second internal electrode layers 211b of roughly rectangular shape that are arranged alternately with dielectric layers in between; (2) a first conductor layer 212 covering one length-direction face of the capacitive element 211; (3) a second conductor layer 213 covering the other length-direction face of the capacitive element 211; (4) a first cover layer 214 covering the exterior face of the first conductor layer 212; and (5) a second cover layer 215 covering the exterior face of the second conductor layer 213. Also, one length-direction ends of the multiple first internal electrode layers 211a are connected to the first conductor layer 212 over connection widths that are equivalent to the respective widths of the multiple first internal electrode layers 211a, while the other length direction ends of the multiple second internal electrode layers 211b are connected to the second conductor layer 213 over connection widths that are equivalent to the respective widths of the multiple second internal electrode layers 211b, and also, one height-direction end of the first conductor layer 212 is connected to the first external electrode 220 over a connection width equivalent to the width of the first conductor layer 212, while one height-direction end of the second conductor layer 213 is connected to the second external electrode 230 over a connection width equivalent to the width of the second conductor layer 213.

In other words, the capacitor body 210 has the first conductor layer 212 whose function is to utilize the width of each first internal electrode layer 211a to connect it to the first external electrode 220, as well as the second conductor layer 213 whose function is to utilize the width of each second internal electrode layer 211b to connect it to the second external electrode 230, and therefore it is possible to maximally prevent the connection of each first internal electrode layer 211a to the first external electrode 220, and the connection of each second internal electrode layer 211b to the second external electrode 230, from becoming unstable even when the width and length of each first internal electrode layer 211a, and the width and length of each second internal electrode layer 211b, are reduced. This means that the multilayer ceramic capacitor comprising the capacitor body 210 of roughly rectangular solid shape, as well as the first external electrode 220 and second external electrode 230 provided on one height-direction face thereof, can achieve reliable connection with respect to the connection of each first internal electrode layer 211a to the first external electrode 220, and also with respect to the connection of each second internal electrode layer 211b to the second external electrode 230, even when meeting the demand for size reduction and capacitance increase.

(e12) The thickness of the first conductor layer 212 and that of the second conductor layer 213, of the capacitor body 210, are set in a range of one to five times the thickness of each of the multiple first internal electrode layers 211a and each of the multiple second internal electrode layers 211b, respectively, and therefore it is possible to maximally prevent the length L of the multilayer ceramic capacitor from increasing due to the thickness of the first conductor layer 212 and that of the second conductor layer 213.

(e13) The thickness of the first cover layer 214 and that of the second cover layer 215, of the capacitor body 210, are set in a range of one to 10 times the thickness of the dielectric layer of the capacitive element 211, and therefore it is possible to maximally prevent the length L of the multilayer ceramic capacitor from increasing due to the thickness of the first cover layer 214 and that of the second cover layer 215.

Next, variation examples (first variation example m11 to fourth variation example m14) of the aforementioned multilayer ceramic capacitor are explained.

Figure 13A:
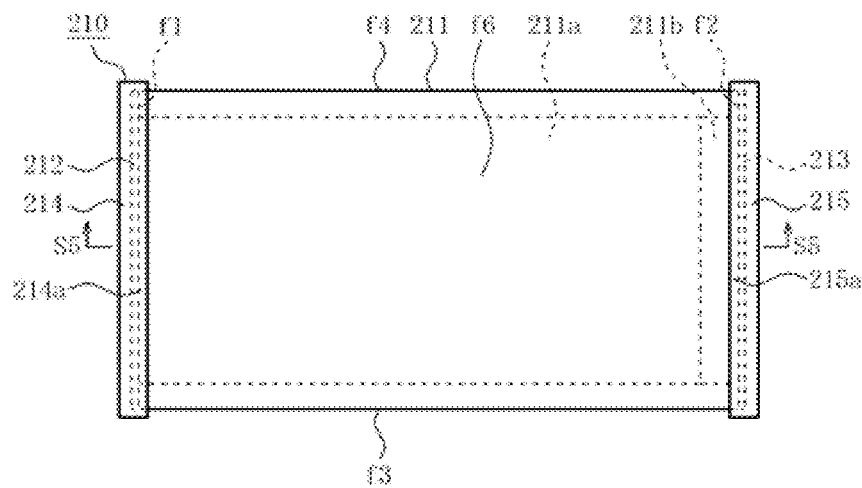
Figure 13B:
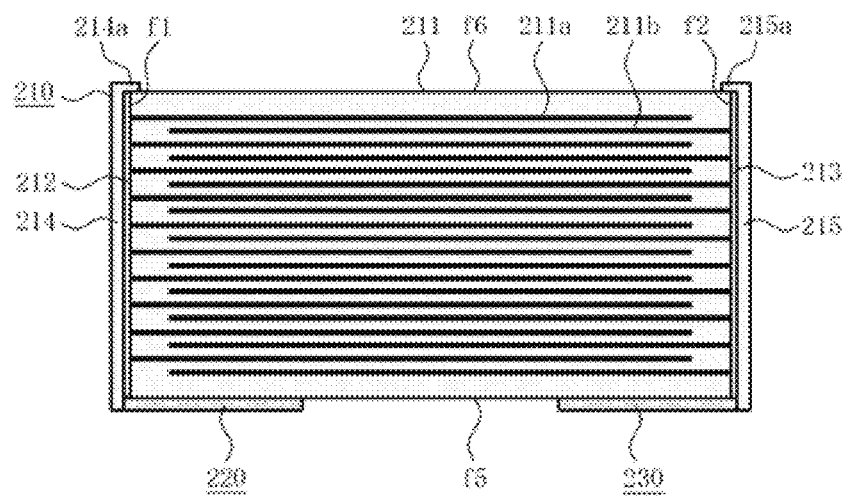
FIG. 13B is a section view of FIG. 13A along line S5-S5.

(m11) As shown in FIGS. 13A and 13B, the periphery of the first conductor layer 212, except for one end connected to the first external electrode 220, may be covered with a part 214a of the first cover layer 214 extending toward the capacitive element 211 side, and also the periphery of the second conductor layer 213, except for one end connected to the second external electrode 230, may be covered with a part 215a of the second cover layer 215 extending toward the capacitive element 211 side. This way, another effect can be achieved, which is that the problem of the first conductor layer 212 and second conductor layer 213 contacting and therefore shorting with any conductor line on the circuit board or any adjacent electronic component, etc., can be prevented even when the multilayer ceramic capacitor falls over on the circuit board during mounting.

Figure 14A:
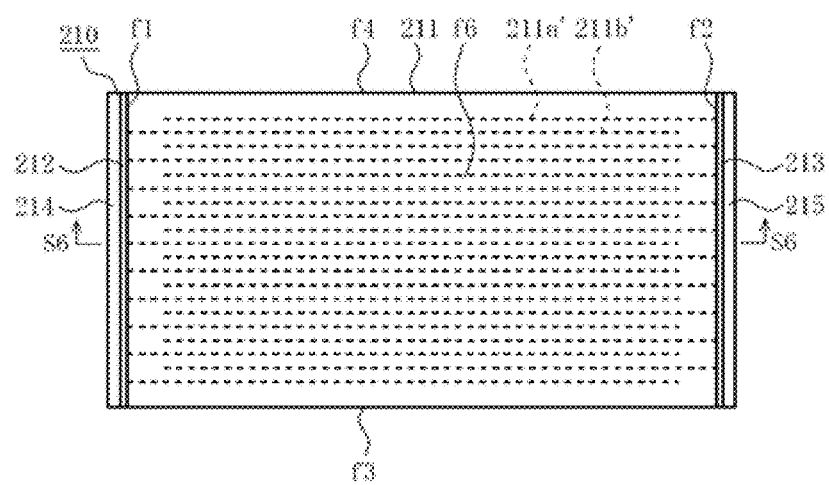
Figure 14B:
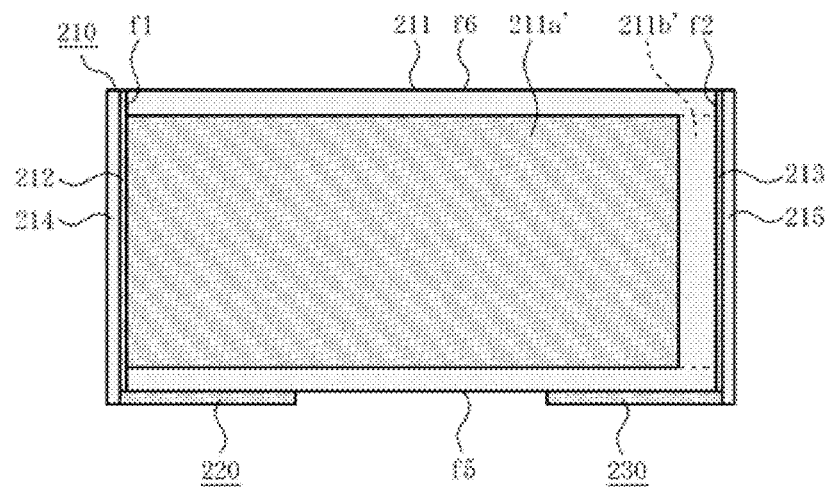
FIG. 14B is a section view of FIG. 14A along line S6-S6.

(m12) As shown in FIGS. 14A and 14B, multiple first internal electrode layers 211a' of roughly rectangular shape and multiple second internal electrode layers 211b' of roughly rectangular shape that are arranged in the width direction with the dielectric layers (not accompanied by symbol) in between may be contained in the capacitive element 211. This way, effects similar to the aforementioned effects e1 to e3 can be obtained, although each first internal electrode layer 211a' and each second internal electrode layer 211b' are oriented roughly at right angles with the first external electrode 220 and second external electrode 230.

(m13) By preparing the unsintered cover layer described in the aforementioned manufacturing example in such a way that it contains approx. 0.1 to 10 atomic percent of MgO or other oxidization accelerator, metal oxides can be interspersed in the first conductor layer 212 and second conductor layer 213 to be produced in the subsequent sintering process, primarily in the areas bordering the first cover layer 214 and second cover layer 215, respectively, so that consequently the adhesion of the first cover layer 214 to the first conductor layer 212, as well as the adhesion of the second cover layer 215 to the second conductor layer 213, can be increased because of these metal oxides.

(m14) By preparing the unsintered conductor layer described in the aforementioned manufacturing example in such a way that it contains approx. 5 to 50 percent by weight of a dielectric ceramic powder whose primary component is the same as that of the capacitive element 211 except for the first internal electrode layer 211a and second internal electrode layer 211b, the adhesion of the first conductor layer 212 to the capacitive element 211, as well as the adhesion of the second conductor layer 213 to the capacitive element 211, can be increased.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-061493, filed Mar. 25, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A multilayer ceramic capacitor comprising a capacitor body of roughly rectangular solid shape, as well as a first external electrode and a second external electrode that are provided on one height-direction face thereof;
wherein the capacitor body comprises:
(1) a capacitive element of roughly rectangular solid shape, which contains multiple first internal electrode layers of roughly rectangular shape and multiple second internal electrode layers of roughly rectangular shape that are arranged alternately with dielectric layers in between; (2) a first conductor layer covering one length-direction face of the capacitive element without extending to the one height-direction face; (3) a second conductor layer covering another length-direction face of the capacitive element without extending to the one height-direction face; (4) a first dielectric ceramic cover layer having a thickness of 1-10 µm and covering an exterior face of the first conductor layer; and (5) a second dielectric ceramic cover layer having a thickness of 1-10 µm and covering an exterior face of the second conductor layer;
wherein one length-direction ends of the multiple first internal electrode layers are exposed on the one length-direction face and in contact with and electrically connected to the first conductor layer over connection widths that are equivalent to respective widths of the multiple first internal electrode layers;
wherein other length-direction ends of the multiple second internal electrode layers are exposed on the other length-direction face and in contact with and electrically connected to the second conductor layer over connection widths that are equivalent to respective widths of the multiple second internal electrode layers;
wherein one height-direction end of the first conductor layer is in contact with and electrically connected to the first external electrode over a connection width equivalent to a width of the first conductor layer; and
wherein one height-direction end of the second conductor layer is in contact with and electrically connected to the second external electrode over a connection width equivalent to a width of the second conductor layer.

2. A multilayer ceramic capacitor according to claim 1, wherein a thickness of the first conductor layer and that of the second conductor layer are set in a range of one to five times a thickness of each of the multiple first internal electrode layers and that of each of the multiple second internal electrode layers, respectively.

3. A multilayer ceramic capacitor according to claim 2, wherein a thickness of the first cover layer and that of the second cover layer are set in a range of one to 10 times a thickness of the dielectric layer of the capacitive element.

4. A multilayer ceramic capacitor according to claim 3, wherein a periphery of the first conductor layer, except for one end connected to the first external electrode, is covered with a part of the first cover layer extending toward a capacitive element side; and
a periphery of the second conductor layer, except for one end connected to the second external electrode, is covered with a part of the second cover layer extending toward a capacitive element side.

5. A multilayer ceramic capacitor according to claim 2, wherein a periphery of the first conductor layer, except for one end connected to the first external electrode, is covered with a part of the first cover layer extending toward a capacitive element side; and
a periphery of the second conductor layer, except for one end connected to the second external electrode, is covered with a part of the second cover layer extending toward a capacitive element side.

6. A multilayer ceramic capacitor according to claim 1, wherein a thickness of the first cover layer and that of the second cover layer are set in a range of one to 10 times a thickness of the dielectric layer of the capacitive element.

7. A multilayer ceramic capacitor according to claim 6, wherein a periphery of the first conductor layer, except for one end connected to the first external electrode, is covered with a part of the first cover layer extending toward a capacitive element side; and
a periphery of the second conductor layer, except for one end connected to the second external electrode, is covered with a part of the second cover layer extending toward a capacitive element side.

8. A multilayer ceramic capacitor according to claim 1, wherein a periphery of the first conductor layer, except for one end connected to the first external electrode, is covered with a part of the first cover layer extending toward a capacitive element side; and
a periphery of the second conductor layer, except for one end connected to the second external electrode, is covered with a part of the second cover layer extending toward a capacitive element side.

9. A multilayer ceramic capacitor according to claim 1, wherein the first conductor layer is a non-plated, sintered layer whereas the first external electrode includes a plated layer, and the second conductor layer is a non-plated, sintered layer whereas the second external electrode includes a plated layer.

10. A multilayer ceramic capacitor according to claim 1, wherein one height-direction end of the first cover layer is, together with the end of the first conductor layer, connected to the first external electrode over the connection width; and one height-direction end of the second cover layer is, together with the end of the second conductor layer, connected to the second external electrode over the connection width.

11. A multilayer ceramic capacitor according to claim 1, wherein the first and second cover layers are constituted by high dielectric ceramics.

12. A multilayer ceramic capacitor according to claim 1, wherein the first and second conductor layers have a thickness of 0.5-5 µm.

* * * * *